United States Patent
Chen

(10) Patent No.: US 7,460,366 B2
(45) Date of Patent: Dec. 2, 2008

(54) HEAT DISSPATING APPARATUS WITH STATIONARY POWER SUPPLY

(75) Inventor: Tsung-Chun Chen, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 173 days.

(21) Appl. No.: 11/651,078

(22) Filed: Jan. 9, 2007

(65) Prior Publication Data

US 2008/0165493 A1    Jul. 10, 2008

(51) Int. Cl.
*H05K 5/00* (2006.01)
(52) U.S. Cl. .................. 361/687; 429/120; 363/53; 307/150
(58) Field of Classification Search ............ 353/20, 353/53; 327/34; 62/259.2; 361/600, 695, 361/679–687, 724–727; 307/82, 150; 429/17, 429/24, 34, 120; 373/23
See application file for complete search history.

(56) References Cited

U.S. PATENT DOCUMENTS

| 6,304,443 B1 * | 10/2001 | Chou ........................ 361/695 |
| 6,577,501 B2 * | 6/2003 | Lin ........................... 361/686 |
| 7,177,149 B2 * | 2/2007 | Lin ........................... 361/695 |
| 2006/0238969 A1 * | 10/2006 | Ya ............................ 361/683 |

FOREIGN PATENT DOCUMENTS

| TW | 392106 A | 6/2000 |
| TW | 400968 A | 8/2000 |
| TW | 568300 A | 12/2003 |
| TW | 572579 A | 1/2004 |
| TW | M247876 U | 10/2004 |
| TW | M268654 U | 6/2005 |

* cited by examiner

*Primary Examiner*—Hung V Duong
(74) *Attorney, Agent, or Firm*—Muncy, Geissler, Olds & Lowe, PLLC

(57) ABSTRACT

A heat dissipating apparatus with stationary power supply includes power supplies having a primary power system and a stationary power system, at least one heat dissipating fan and a fan driving unit electrically connected to the stationary power system. The stationary power of the fan driving unit is used for the operation, and the stationary power system has a function of detecting the temperature during its normal output and determining whether or not to supply stationary power for the operation of the heat dissipating fan according to the temperature inside a computer casing, such that the computer casing can achieve the effect of lowering its internal temperature normally and automatically.

16 Claims, 3 Drawing Sheets

HEAT DISSPATING APPARATUS WITH STATIONARY POWER SUPPLY

FIELD OF THE INVENTION

The present invention relates to a heat dissipating apparatus with stationary power supply, and more particularly to a power supply of a stationary power system used for driving the operation of a heat dissipating fan, when the stationary power system outputs power normally.

BACKGROUND OF THE INVENTION

Since components of an electronic device usually wear out during the operation of the electronic device, and the square of power is directly proportional to the square of the current, therefore the greater the current, the larger is the damage or consumption of the components. Furthermore, the power required for a vast majority of components of the present computers becomes increasingly larger, and thus the damage and consumption are increased accordingly. Such damage and consumption represent the production of waste heat, and an increase of consumption and damage indicates that more waste heats are produced by the components in the electronic device, and the internal temperature of the electronic device will rise unceasingly. If such heat is not dissipated timely, then an overheating may affect normal operations of the electronic components. Inventions for enhancing or extending the working efficiency of a heat dissipating fan were disclosed in R.O.C. Patent Publication No. 392106 entitled "Heat dissipating fan delay switch for computer motherboard" for the situation of unable to reduce the accumulated heat or lower the temperature after the computer system is turned off. Such patented invention provides the technology of outputting a fan ON/OFF control signal from a South Bridge chip and sending the control signal from a control circuit to a fan power supply switching ON/OFF circuit to convert the power supply when the heat dissipating fan is off, so as to delay the time of shutting down the fan after the computer is turned off, and increase the heat dissipating time; and R.O.C. Patent Publication No. 400968 entitled "Delay ON/OFF apparatus of a heat dissipating fan" for providing the technology of electrically connecting a stationary power system and a primary power supply system to supply electric power with a delay ON/OFF apparatus, and switch and supply different electric power to drive the heat dissipating fan when the computer system is on or off, but the technology disclosed in R.O.C. Patent Publication No. 400968 is used extensively in the present market. Technologies based on such technology were developed and disclosed in R.O.C. Patent Publication No. 572579 entitled "Power supply with a heat dissipating effect after a computer is turned off", R.O.C, Patent Publication No. 568300 entitled "Control apparatus for fan operating mode", R.O.C, Patent No. M247876 entitled "Temperature recovery preventing apparatus driven by a power supply enabling system for compulsorily dissipating heat when a computer is turned off" and R.O.C. Pat. No. M268654 entitled "Delay apparatus for heat dissipating fan independent to power supply". The main innovative ideas of the aforementioned patents reside on that after a computer is turned off, the operation of the heat dissipating fan is delayed, so that the fan can be operated continuously for a period of time after the computer is shut down. However, the power output of the present power supply is increased significantly up to thousands of watts, and thus the stationary power for maintaining the operation of the computer anytime also will produce a significant amount of waste heat, and the prior art is limited to the extension of the working time of the heat dissipating fan after the computer is turned off, but it cannot start the heat dissipating fan while the computer is off. As a result, the internal temperature of a shut-down computer still rises constantly. Obviously, we need a feasible solution for providing the heat dissipating capability for a computer, when the computer is turned off at regular time.

SUMMARY OF THE INVENTION

The temperature in a computer rises constantly, since the present stationary power system of a high-power power supply produces damage and consumption after the computer is turned off, the invention provides a control apparatus for starting the heat dissipating fan if the stationary power system outputs power.

Therefore, it is a primary objective of the present invention to provide a heat dissipating apparatus with stationary power supply, wherein the computer has the functions of detecting the temperature when the computer is off, and starting the heat dissipating fan when the detected temperature is too high. The heat dissipating apparatus comprises power supplies of a primary power system and a stationary power system, at least one heat dissipating fan and a fan driving unit electrically connected to the stationary power system. The fan driving unit comprises a start circuit for turning on or off the heat dissipating fan, and a control circuit for controlling an operating parameter of the heat dissipating fan. If the computer is operated normally, the primary power system will supply electric power to the heat dissipating fan. If the primary power system cannot output power, then the fan driving unit can be controlled whether or not to supply the stationary power to the heat dissipating fan for its operation according to the temperature inside the computer casing, and thus the computer can achieve the effect of automatically lowering the temperature inside the computer casing.

DETAILED DESCRIPTION OF THE PREFERRED EMBODIMENTS

The present invention will now be described in more detail hereinafter with reference to the accompanying drawings that show various embodiments of the invention.

Figure 1:
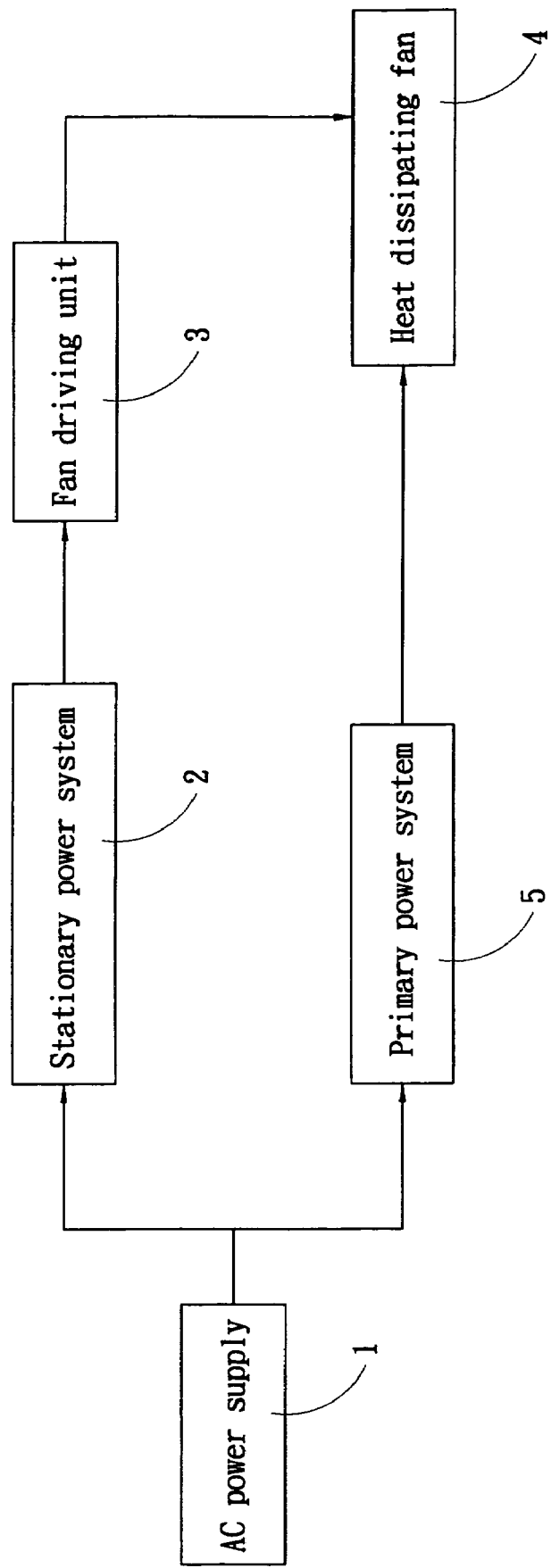
FIG. 1 is a block diagram of a basic architecture of the present invention.

Referring to FIG. 1 for a basic architecture of the present invention, the invention comprises power supplies of a primary power system 5 and a stationary power system 2. The power supply is obtained from a primary electric power and a stationary power and converted into an AC power source 1, wherein the primary power system 5 is operated when the computer is turned on, and the stationary power system 2 supplies a stationary power after the stationary power system 2 is electrically connected to the AC power source 1, and at least one heat dissipating fan 4 is electrically connected to the primary power system 5, such that when the computer is on, the primary power system 5 supplies electric power for the operation of the heat dissipating fan 4. Further, the stationary power system 2 is electrically connected to a fan driving unit 3, such that the fan driving unit 3 has the function of detecting temperature, when the stationary power system 2 outputs power normally. The fan driving unit 3 is electrically connected to the heat dissipating fan 4, such that when the temperature inside the computer casing is excessively high, the fan driving unit 3 will drive the heat dissipating fan 4 to obtain the stationary power for the operation of lowering the temperature inside the computer casing.

Figure 2:
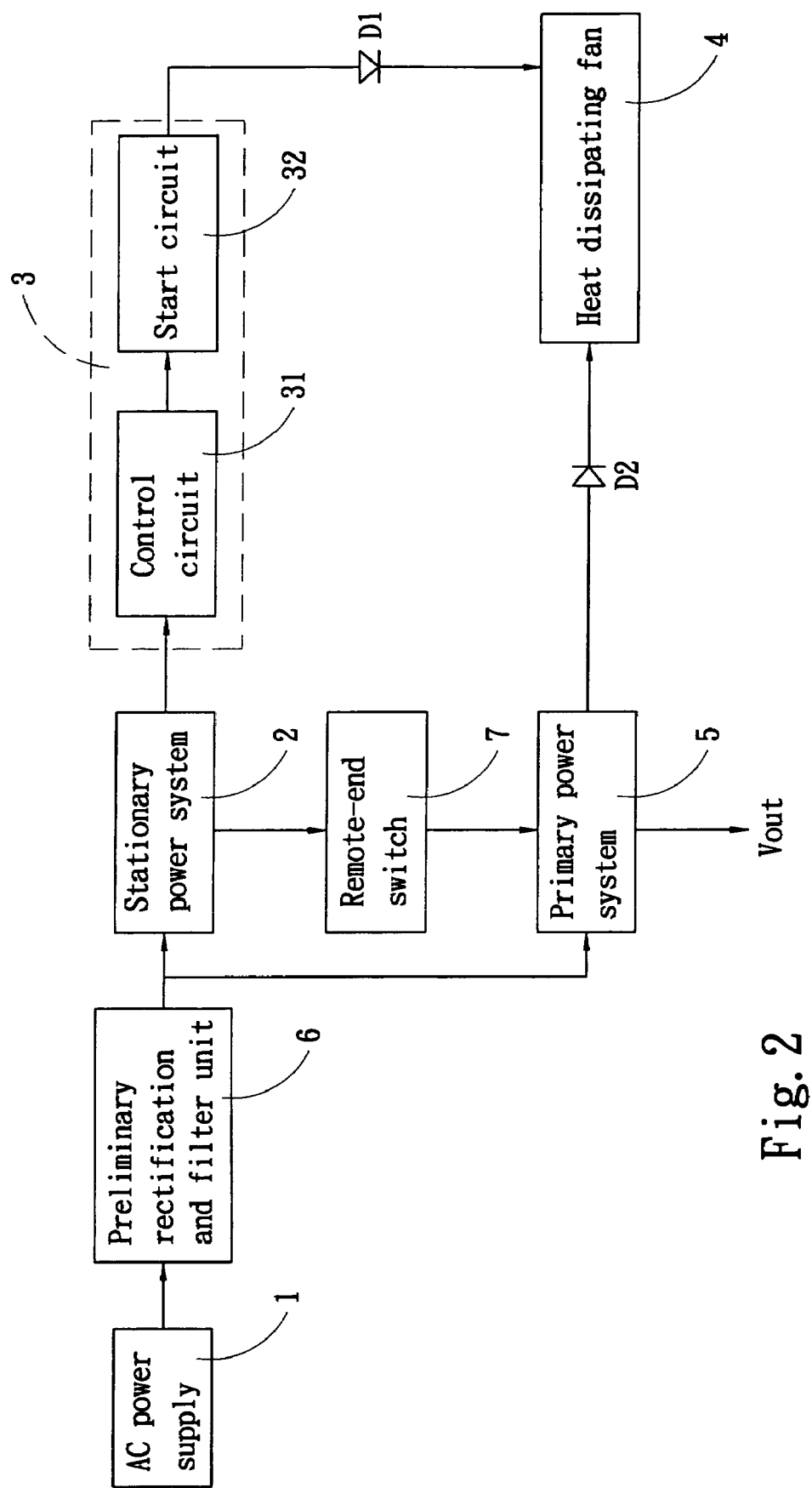
FIG. 2 is a block diagram of a preferred embodiment of the present invention.

Referring to FIG. 2 for a circuit block diagram of a preferred embodiment of the present invention, the power supply is electrically connected to the AC power source 1, and then a primary rectification and filter unit 6 filters and converts power into direct current, and a rear-end of the primary rectification and filter unit 6 is connected in parallel with a primary power system 5 and a stationary power system 2. If the power supply is electrically connected to the AC power source 1, the stationary power system 2 will start supplying stationary power, and the stationary power will drive a remote-end switch unit 7 to prepare triggering a boot. After the remote-end switch unit 7 is triggered, the primary power system 5 starts operating and the computer stats booting, and the primary power system 5 also supplies electric power for the operation of at least one heat dissipating fan 4, so as to maintain the normal operation of the computer. If the primary power system 5 stops outputting power, the stationary power system 2 will output the stationary power and electrically connect a fan driving unit 3. The fan driving unit 3 comprises a control circuit 31 and a start circuit 32, and the control circuit 31 further comprises a temperature sensor, such that if the temperature inside the computer casing is higher than a predetermined temperature, then the start circuit 32 will conduct the stationary power to the heat dissipating fan 4, and the operation of the heat dissipating fan 4 will lower the temperature inside the computer casing until the temperature is lower than a predetermined temperature, and then the start circuit 32 will turn off the heat dissipating fan 4. The control circuit 31 further comprises a combinational circuit of a temperature sensor and a timer, such that if the temperature inside the computer casing is higher than the predetermined temperature, the start circuit 32 will conduct the fan for its operation. The timer conducts the start circuit 32 for a predetermined time period, and controls the operating time of the heat dissipating fan 4. If the temperature is higher than the predetermined temperature when the heat dissipating fan 4 is turned off, then the timer will extend the conduction of the start circuit 32 for a predetermined time period and the operating time of the heat dissipating fan 4. The control circuit 31 only includes a timer circuit for instructing the start circuit 32 to start the operation of the heat dissipating fan 4 for a predetermined time period once for every specified time, and thus the stationary power system 2 will have the heat dissipating capability when the stationary power system 2 is operated, and the heat dissipating fan 4 can be started automatically for lowering the temperature when the primary power system 5 stops outputting power.

Figure 3:
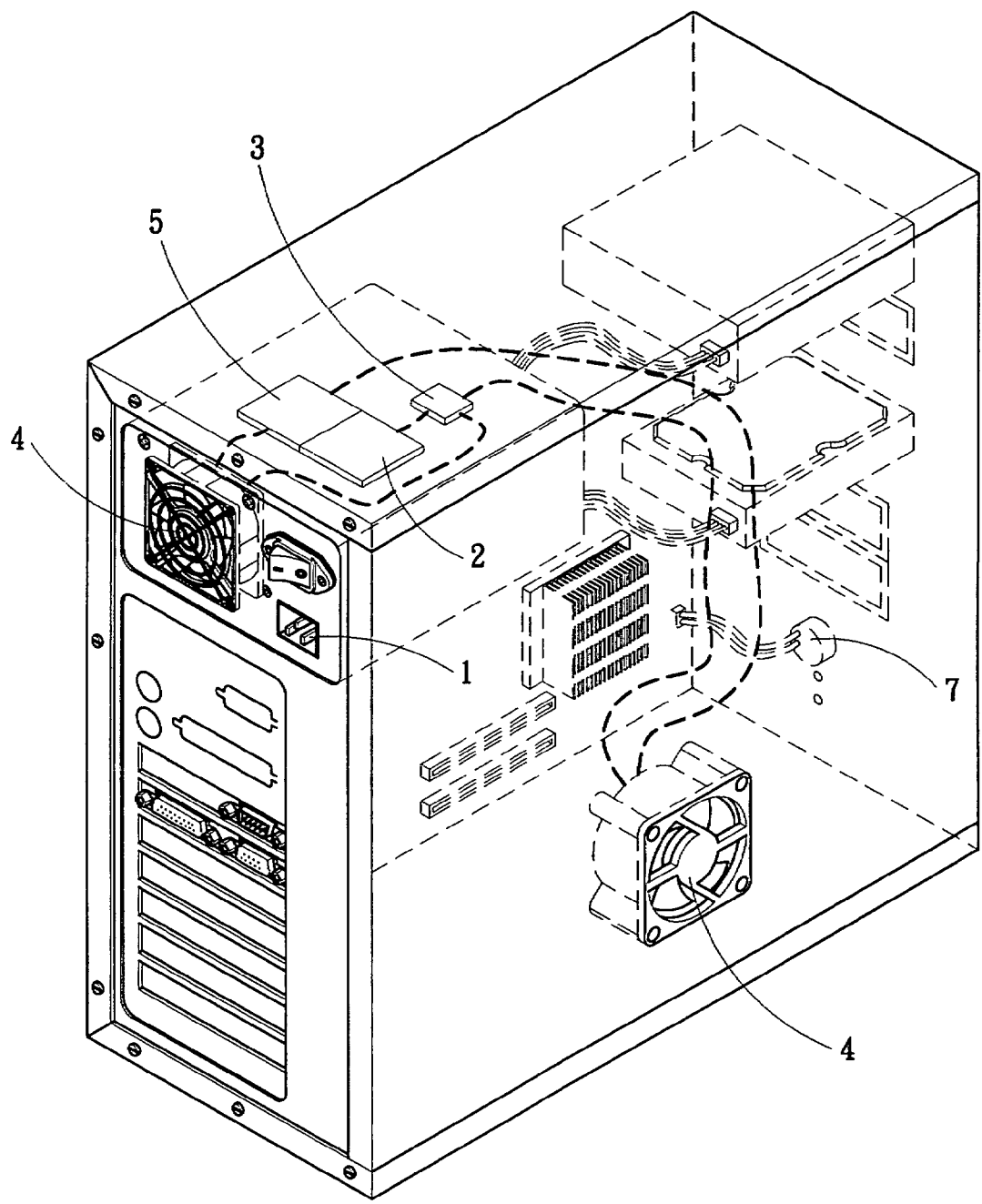
FIG. 3 is a schematic view of a preferred embodiment of the present invention.

Referring to FIG. 3 for a schematic view of a basic architecture of a computer, the heat dissipating fan 4 controlled by the start circuit 32 comprises a heat dissipating fan 4 installed separately at a power supply and a computer casing, and the primary power system 5 with the power supply is electrically connected to the heat dissipating fan 4, such that when the computer is turned on, the primary power system 5 can supply the required power to the heat dissipating fan 4; and if the stationary power system 2 is electrically connected to the fan driving unit 3, and the fan driving unit 3 is electrically connected to the heat dissipating fan 4, and the stationary power system 2 normally outputs power, the fan driving unit 3 will control the stationary power whether or not to conduct the heat dissipating fan 4 for its operation according to the temperature inside the computer casing, so that the computer can turn on the heat dissipating fan 4 for lowering the temperature when the primary power system 5 stops its normal operation.

In summation of the description above, the present invention herein enhances over the prior art and further complies with the patent application requirements, and thus is duly applied for the patent application.

While the invention has been described by means of specific embodiments, numerous modifications and variations could be made thereto by those skilled in the art without departing from the scope and spirit of the invention set forth in the claims.

What is claimed is:

1. A heat dissipating apparatus with stationary power supply, for maintaining the working capability of at least one heat dissipating fan installed inside a computer casing when said computer stops operating, comprising:
   a power supply having a primary power system and a stationary power system, electrically connected to an AC power source and converted into a DC power output; and
   a fan driving unit, connected to said stationary power system for obtaining stationary power when said stationary power system is operated, such that said stationary power system has the capability of starting the operation of at least one heat dissipating fan to achieve a heat dissipating effect.

2. The heat dissipating apparatus with stationary power supply of claim 1, wherein said power supply of said stationary power supply system is electrically connected to said AC power source for generating stationary power.

3. The heat dissipating apparatus with stationary power supply of claim 1, wherein said fan driving unit comprises a start circuit for turning on or off the operation of said heat dissipating fan and a control circuit for controlling an operating parameter of said heat dissipating fan.

4. The heat dissipating apparatus with stationary power supply of claim 3, wherein said start circuit drives said heat dissipating fan to obtain said stationary power for the operation of said heat dissipating fan.

5. The heat dissipating apparatus with stationary power supply of claim 3, wherein said control circuit includes a temperature sensor.

6. The heat dissipating apparatus with stationary power supply of claim 3, wherein said control circuit includes a timer.

7. The heat dissipating apparatus with stationary power supply of claim 3, wherein said control circuit includes a combinational circuit of a temperature sensor and a timer.

8. The heat dissipating apparatus with stationary power supply of claim 5, wherein said temperature sensor electrically conducts said start circuit to drive the operation of said heat dissipating fan after said temperature sensor detects an excessively high temperature inside said computer casing, and drives said start circuit to turn off said heat dissipating fan after said temperature sensor detected a temperature lower than a predetermined temperature.

9. The heat dissipating apparatus with stationary power supply of claim 6, wherein said timer drives said heat dissipating fan to operate a predetermined time period after said stationary power system has been operated for a predetermined time.

10. The heat dissipating apparatus with stationary power supply of claim 7, wherein said temperature sensor conducts and supplies said stationary power to drive the operation of said heat dissipating fan after said temperature sensor detects an excessively high temperature inside said computer casing, and said timer drives said start circuit to output electric power in a predetermined time period and control an operating time of said heat dissipating fan.

11. The heat dissipating apparatus with stationary power supply of claim 10, wherein said timer extends the electric conduction of said start circuit for a predetermined time period and extends the operating time of said heat dissipating fan, when the temperature detected by said temperature sensor is higher than a predetermined temperature for turning off said heat dissipating fan.

12. The heat dissipating apparatus with stationary power supply of claim 1, wherein said heat dissipating fan is electrically connected to said fan driving unit and said primary power system.

13. The heat dissipating apparatus with stationary power supply of claim 12, wherein said heat dissipating fan obtains electric power for a normal operation when said primary power system outputs power.

14. The heat dissipating apparatus with stationary power supply of claim 1, wherein said heat dissipating fan includes a heat dissipating fan built in said power supply and a plurality of primary heat dissipating fans for circulating air inside said computer casing.

15. The heat dissipating apparatus with stationary power supply of claim 1, wherein said fan driving unit a standalone apparatus externally connected to said power supply.

16. The heat dissipating apparatus with stationary power supply of claim 1, wherein said fan driving unit is built in said power supply.

* * * * *